United States Patent [19]
Van Oorschot et al.

[11] Patent Number: 6,134,550
[45] Date of Patent: *Oct. 17, 2000

[54] METHOD AND APPARATUS FOR USE IN DETERMINING VALIDITY OF A CERTIFICATE IN A COMMUNICATION SYSTEM EMPLOYING TRUSTED PATHS

[75] Inventors: Paul C. Van Oorschot, Ottawa; Michael J. Wiener, Nepean; Ian Curry, Kanasa, all of Canada

[73] Assignee: Entrust Technologies Limited, Ottawa, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 09/040,744

[22] Filed: Mar. 18, 1998

[51] Int. Cl.[7] ................................................. G06F 17/00

[52] U.S. Cl. .................... 707/9; 707/10; 707/101

[58] Field of Search ............... 705/39; 380/23–30, 380/277, 280; 707/1–206

[56] References Cited

U.S. PATENT DOCUMENTS

| | | | |
|---|---|---|---|
| 5,220,604 | 6/1993 | Gasser et al. | 380/25 |
| 5,224,163 | 6/1993 | Gasser et al. | 380/30 |
| 5,315,657 | 5/1994 | Abadi et al. | 380/25 |
| 5,666,416 | 9/1997 | Micali | 380/23 |
| 5,671,280 | 9/1997 | Rosen | 380/24 |
| 5,687,235 | 11/1997 | Perlman et al. | 380/25 |
| 5,745,574 | 4/1998 | Muftic | 380/23 |
| 5,745,886 | 4/1998 | Rosen | 705/39 |

OTHER PUBLICATIONS

Levi et al., "Verification of classical certificates via nested certificates nested certificate paths," Computer Communications and Networks, 1999, Proceedings, Eighth International Conference on, pp. 242–247, Oct. 1999.

Xu et al., "Certificate path generating protocol (CPGP) for authentic signaling in ATM networks," Network Protocols, 1998, Proceedings, Sixth International Conference on, pp. 282–289, Oct. 1998.

Reiter et al., "Resilient authentication using path independence," Computers, IEEE Transactions on, pp. 1351–1362, Dec. 1998.

Handbook of Applied Cryptography, Alfred Menezes et al, (1997), pp. 572–576.

PKI Architectures and Interoperability, preliminary draft for Federal PKI TWG, by W.E Burr, published on the World Wide Web, Mar. 6, 1998.

Toward a National Public Key Infrastructure, IEEE Communications Magazine, Sep. 1994 by Santosh Chokani, pp. 70–74.

Data Structures and Algorithms, Alfred V. Aho et al., (1983), Addison Wesley Publishing Company, pp. 215–218 and pp. 239–244.

Graph Theory With Applications, J. A. Bondy and U.S.R. Murty, (1981), pp. 14–21.

*Primary Examiner*—Thomas G. Black
*Assistant Examiner*—David Jung
*Attorney, Agent, or Firm*—Markison & Reckamp, P.C.,

[57] ABSTRACT

A method and apparatus constructs a preferred certificate chain, such as a list of all certificate authorities in a shortest trusted path, based on generated certificate chain data, such as a table of trust relationships among certificate issuing units in a community of interest, to facilitate rapid validity determination of the certificate by a requesting unit. In one embodiment, requesting units, such as certificate validation units or subscribers, send queries to a common certificate chain constructing unit. Each query may identify a beginning and target certification authority in the community. The certificate chain constructing unit then automatically determines the certification chain among certification issuing units between the beginning and target certification authorities for each query and provides certificate chain data to the requesting unit. The requesting unit then performs validity determination on the certificate to be validated based on the certificate chain data.

38 Claims, 7 Drawing Sheets

METHOD AND APPARATUS FOR USE IN DETERMINING VALIDITY OF A CERTIFICATE IN A COMMUNICATION SYSTEM EMPLOYING TRUSTED PATHS

FIELD OF INVENTION

The invention relates generally to computer security systems employing cryptographic techniques to secure information, and more particularly to computer network security systems using cryptographic techniques that employ certificates.

BACKGROUND OF THE INVENTION

In typical public key cryptography systems, digital signature key pairs, having a private key and public key, are often used to authenticate a digital signature of a subscriber using a software application in order to confirm the identity of the sender of the message. A subscriber may generally be for example a network computer node, a software application or user in the security system. In addition to digital signature key pairs, encryption key pairs are also generally used to encrypt the data being sent from one subscriber to another subscriber within the computer network. Certificates are typically generated by a trusted certification authority for the public keys of the private/public key pair to certify that the keys are genuinely owned by a named subscriber. Standards, such as ISO 9594-8 available from the International Organization for Standardization, define typical certificate content.

In a network community, there may be a multitude of different certification authorities and many subscribers. Generally, each subscriber stores a certification authority public key to verify that a trusted certification authority issued the certificate. A public key certificate typically includes a user public key which is bound by the signature of the certification authority to the subscriber name, and other data including expiry data indicating the expiration date or period for the public key certificate. Each sender (subscriber) has a copy of its own certificate. To send an encrypted message, a sender may access a directory, such as an onboard client cache memory or other certificate storage medium to get a copy of an encryption certificate for a specified receiver. When receiving digitally signed data, a receiver obtains a signature verification certificate and determines from the obtained certificate whether the sender has a valid signature. Generally, for a certificate to be considered valid, the digital signature must be valid and there must be no existing expiration or revocation of the certificate by an associated certification authority. Hence, subscribers typically serve as certificate validation units and validate certificates before encrypting information to other subscribers. Similarly, the subscribers also need to verify signature verification certificates before using a public key to validate a subscriber's signature.

In computer network systems that employ cryptography, the certification authority, also referred to herein as the certificate issuing unit, typically issues certificates for subscribers that use the associated certification authority as the primary trusted server. Alternatively, in some systems a trusted subscriber may play the role of a CA in generating and signing certificates of other subscribers. In larger networks, the trust relationships between the certification authorities typically involve multiple certification authorities. Trust relationships between certification authorities determine how certificates issued by one certification authority may be utilized or verified by entities certified by distinct certification authorities such as those in other networks. Since public key certificates provide a mechanism for obtaining authenticated public keys, provided the verifier has a trusted verification public key of the certification authority which signed the certificate, trusted paths may be established and maintained among the certification authorities and hence subscribers in large computer networks. In the case of multiple certification authorities, a certificate verification unit, such as a subscriber, may wish to obtain an authentic public key by verifying a certificate signed by a certification authority other than one for which it originally possesses a trusted public key. In this case, the verifier may still verify a certificate signed by other certification authorities provided a chain of certificates can be constructed which corresponds to an unbroken chain of trust from the certification authority public key which the verification unit does trust, to the public key it wishes to obtain trust in.

Conventional cryptographic systems, such as many public key cryptography systems, typically use a distributed directory where all certificates and certificate revocation lists are duplicated so each subscriber in a system can access the directory to perform validation. Certificate chains correspond to directed trust paths, also known as certification paths, such as trust relationships among certification authorities where at least one certification authority (CA) has certified another certification authority. A certificate containing the public key of a certification authority is called a CA-certificate. A CA-certificate resulting from one CA certifying another CA is called a cross-certificate, and the process of creating such a certificate is called cross-certification. In this case the CA which signs the certificate is different from the CA whose public key appears within the certificate. A CA-certificate may be either a cross-certificate or a self-signed certificate (where the latter is a CA-certificate signed by the same CA whose public key is within the certificate). One way certification occurs where one certification authority certifies another certification authority but reciprocal certification does not occur. Where a pair of certification authorities certify each other, this is referred to as mutual cross-certification. In this case, the two corresponding cross-certificates are called a cross-certificate pair.

To ensure validity of a subscriber's public key, so that a subscriber may receive or send information along a fully trusted path, the goal for a verification unit is to find a sequence of certificates corresponding to a certification path starting at the certification authority whose public key the subscriber trusts a priori, and ending at a target certification authority which has signed the certificate of the public key to be verified. If the search for trusted paths is carried out using conventional search techniques, such as breadth first or depth first techniques as known in the art (see for example page 215–218 and 239–244 in "Data Structures and Algorithms", by Alfred V. Aho, John E. Hopcroft, and Jeffrey D. Ullman, published in 1983 by Addison-Wesley, Reading, Mass., incorporated herein by reference), then a problem arises by way of reduced system performance when large numbers of certification authorities are in the community of interest, and many different combinations of links among certification authorities in various networks (or the same network) exist. In such systems, a verification unit may spend valuable processing time verifying all combinations of links to determine whether a trusted path has been maintained with the certification authority of the verifying verification unit and the certificate issuing unit that issued the target certificate. An inefficiency results when many of the steps involved in an exhaustive search which explores a large number of network nodes, for example in a breadth-first search, end up leading to untrusted or non-existent paths, and therefore unnecessarily consumed computational effort. For example, the validation unit typically has to find the certification paths every time a signed electronic document is received or any time an encryption occurs; checking a large number of possible certification authority paths can be unnecessary and can take long periods of time thereby decreasing the system performance. In large systems, the performance may be so impeded as to render the validation unit impractical.

Hierarchical chain trust structures with one way and/or mutual cross-certification among certificate issuing units typically have verification units verify in the following manner. Each entity or verification unit starts with a trusted public key, for example the public key of the certificate issuing unit which created its own certificate (parent CA). The shortest trust chain from any entity is a path in the tree which travels upward from the parent to a least common ancestor of the entity and a target entity, and then onwards back down to the target entity. However, substantial entity resources can be expended in analyzing all of the possible certification links where a network contains a large number of certification authorities.

Figure 1:
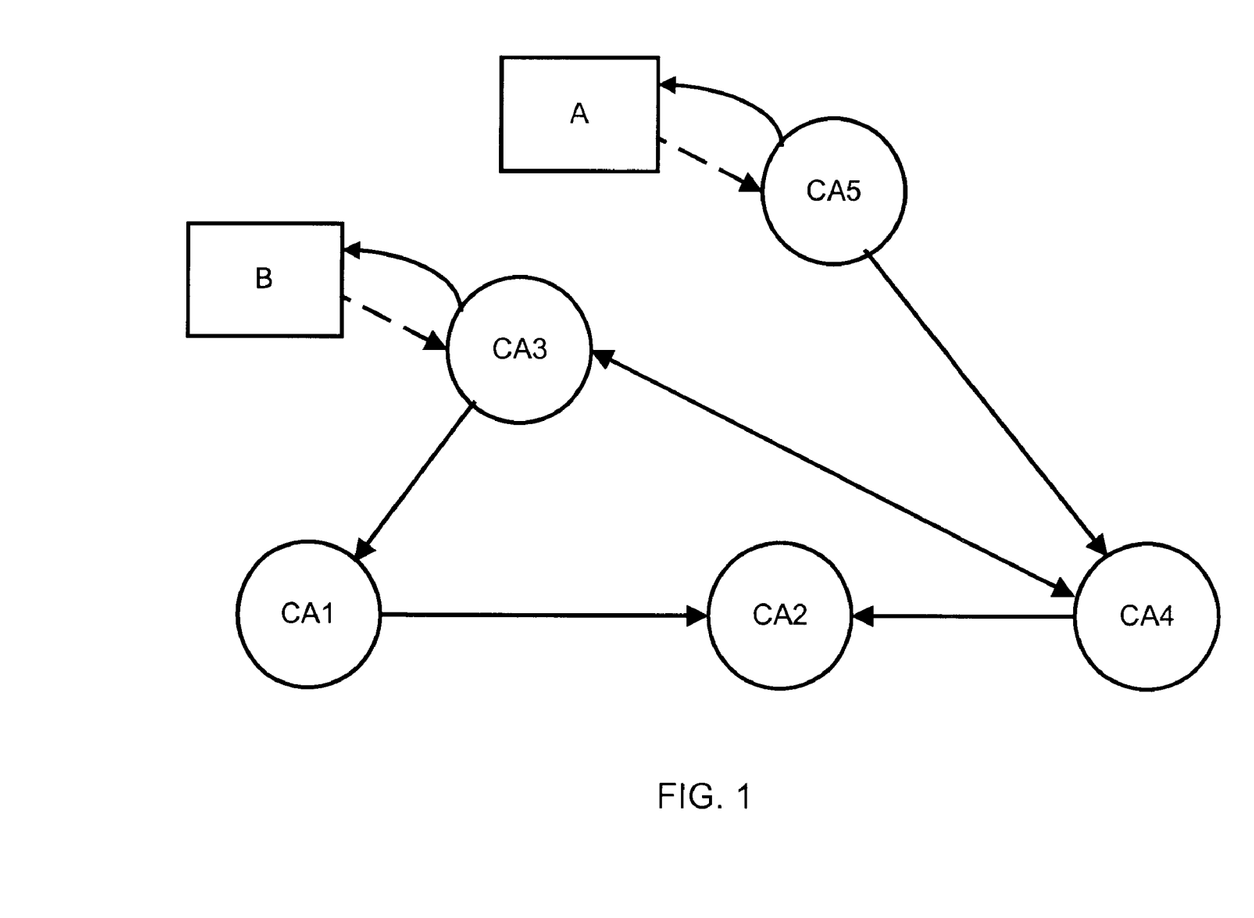
FIG. 1 is a diagram of a trusted communication system illustrating trust relationships between entities, as is common in prior art certificate validity techniques.

Referring to FIG. 1, an example of another known certificate issuing unit trust structure is shown, sometimes referred to as a distributed trust arrangement. The solid lines represent trust relationships and the arrows on the solid lines represent a signed certificate. For example, CA1 has certified the public key certificate of CA2. Also, mutual cross-certification exists between CA3 and CA4. The dashed lines from subscribers A and B represent each subscriber holding a copy of the CA public key and thereby trusting the CA implicitly. If subscriber A in possession of public key P5 of CA5 wishes to verify the certificate of the subscriber B signed by CA3 and thereby obtain trust in the public key (PB) of B, a directed path (CA5, CA4, CA3) exists. However, the subscriber A in a conventional rooted hierarchy based system, in which subscribers trust the public key of the root CA in the hierarchy, may be provided with the chain by another subscriber. This chain is from the root CA to a subscriber unit and may or may not be the shortest path. However, in distributed trust systems the subscriber A is not typically provided with the chain, and the subscriber must attempt to construct the chain, possibly every time a document is sent or encrypted. For example, subscriber A examines the data stored under its own CA entry from the common directory and evaluates all CA cross-certificates. Subscriber A then typically evaluates each CA entry of the cross-certified CA's in the common directory and obtains the certificates for each of the listed CA's. The subscriber A continues to expand all paths to each node (CA) encountered until it finds the certificate of the destination CA it is seeking. If all subscribers are performing this operation continuously, system performance can suffer and additional expense can be incurred.

Routing tables are known in communication systems to facilitate routing of information among nodes. However, such known routing systems do not typically determine trust path construction among trusted certificate issuing units nor provide certificate validation information for certificate validation units. Also, while methods for determining certificate revocation status have been proposed involving sending queries or certification information to a certificate status checking unit, to date such systems typically involve only one CA and do not address issues related to certificate chain construction as the chain is fixed or known.

Consequently there exists a need for a method and apparatus for determining the validity of a certificate in a communication system employing trusted paths which addresses these problems.

DETAILED DESCRIPTION OF THE INVENTION

A method and apparatus for determining validity of a certificate in a communication system employing trusted paths provides certification path information for a plurality of subscriber units so that each subscriber unit does not need to perform a separate operation of independently reconstructing trusted paths among certificate issuing units. The method and apparatus compiles certification authority trust data, such as cross-certification data from the directory (e.g., X.500 directories or LDAP-compliant repositories) and stores the compiled data as certificate chain data. Depending upon the degree of compilation, a subscriber, certification authority, separate chain constructing server or other entity uses the compiled data as data representing the preferred certificate chain, or constructs a preferred certificate chain using the certificate chain data.

For example, where a high degree of compilation is performed, the certificate chain data may be a list of all certification authorities in a shortest trusted path starting with a subscriber's own CA and ending with the target CA that issued the certificate of the subscriber that sent a digitally signed message. The compiled certification authority trust data serves as certificate chain data that may be for example, a table of trust relationships among the certificate issuing units in a community of interest, to facilitate rapid validity determination of the certificate by a plurality of requesting units. By way of example, the compilation may consist of populating a database that can be repeatedly queried by multiple subscribers to provide a preferred chain of certificates in a shortest trusted path among two subscribers, or between their respective CAs. If preferred, the stored certificate chain data can also include the associated certificates, or other information such as revocation status information related to the associated certificates, for each of the certificate issuing units listed in the table.

Moreover, a certificate chain data constructing unit can provide the certificates of the corresponding certification authorities in a constructed chain directly to a requesting unit. Alternatively, the certificate chain data constructing unit can provide names or directory information or other identification data of those certification authorities in a selected path between a beginning and target certification authority, for example the target CA being the CA which issued the certificate of a subscriber whose public key certificate is to be verified.

In one embodiment, a requesting unit, such as a certificate validation unit or subscriber, sends a query to the certificate chain constructing unit including information identifying a beginning and target certification authority. The certificate chain constructing unit, using the certificate chain data, then automatically determines the preferred certificate chain among certification issuing units between the beginning and target certification authorities and provides data, such as a list of CA's in the shortest path, to the requesting unit. The requesting unit then performs validity determination on the certificate to be validated based on the certificate chain data. Other variations are also described herein.

Figure 2:
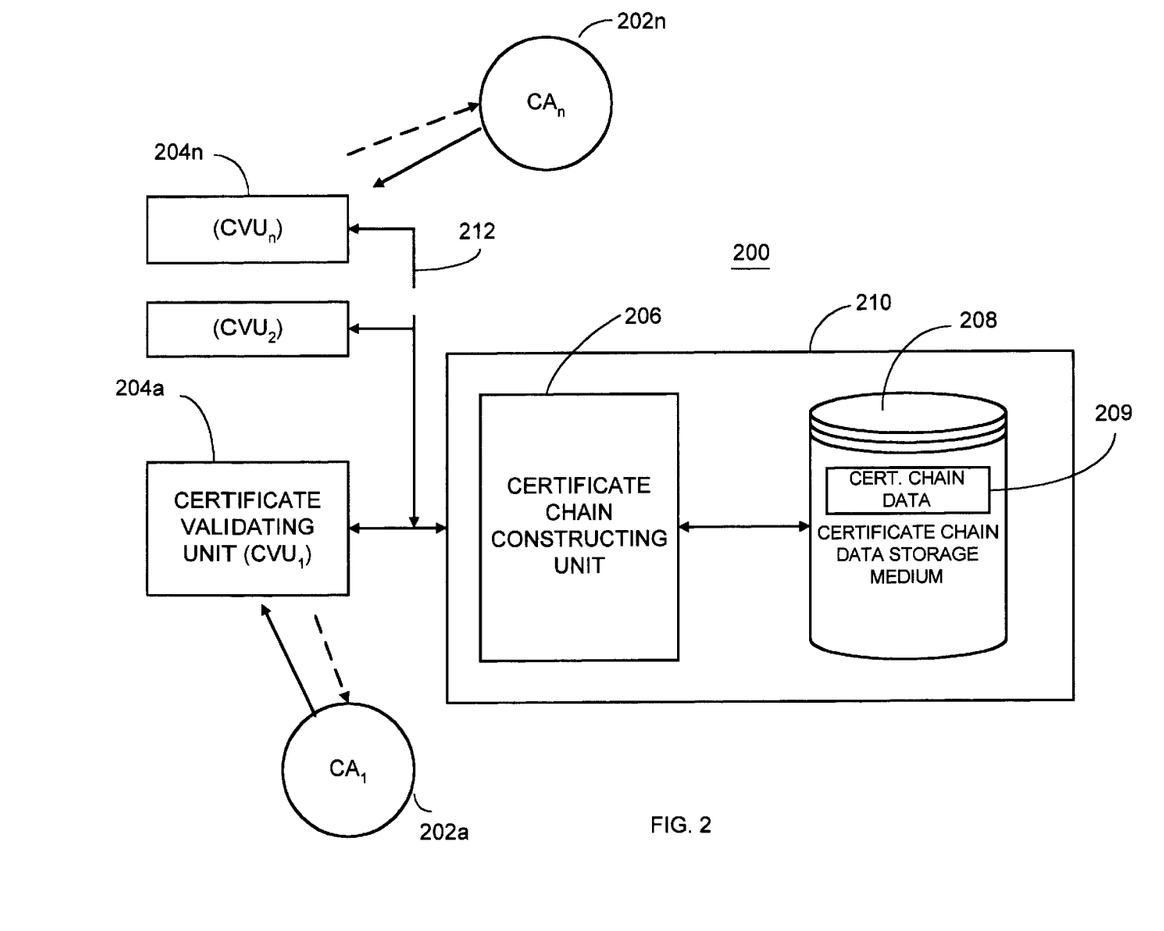
FIG. 2 is a block diagram generally showing one embodiment of the invention.

FIG. 2 depicts one embodiment of an apparatus for use in determining validity of the certificate. A communication system 200 includes a number of certificate issuing units 202a–202n for issuing public key certificates, attribute certificates or any other suitable certificates, a plurality of certificate validation units 204a through 204n, such as a subscriber that may be used to perform encryption for other subscribers. A certificate chain constructing unit 206 and a certificate chain data storage medium 208 are incorporated into a network server 210. The server 210 communicates with the certificate validation units 204a–204n through communication link 212, such as a bus, network link, Internet link, wireless link or other suitable communication link. The certificate validating units 204a–204n are also linked to the certificate issuing units 202a–202n as known in the art.

The certificate chain constructing unit 206 may be a suitably programmed central processing unit or other data manipulation device. The certificate chain data storage medium 208 is preferably a database but may take any suitable form for storing data. The certificate chain data storage medium 208 stores certificate chain data 209, such as a look up table containing entries of data representing trust relationships preferably among all relevant certificate issuing units 202a–202n in a community of interest. However, it will be recognized that data representing fewer than all trust relationships may be stored if desired. The certificate chain data 209 is compiled from certification authority trust data. Certification authority trust data may include for example, cross-certification data, revocation data and/or other data stored in a distributed directory (e.g., X.500 directories or LDAP-compliant repositories). The certificate chain data 209 is prepared once, and periodically updated as needed, for more than one subscriber and may be repeatedly used each time validation needs to occur.

In one embodiment, the certificate chain constructing unit 206 uses data from the certificate chain data storage medium 208 to construct a preferred trust path, such as a shortest trusted path or a trusted path having the highest degree of trust where multiple paths exist, by constructing the preferred certificate chain data for each of a number of selected certificate validating units 204. The certificate validating unit 204 sends a query in the form of a request signal to the certificate chain constructing unit 206 to obtain certificate chain information relating to a preferred certificate chain between certificate issuing units in a trusted path in a community of interest. The certificate chain constructing unit 206 analyzes the certificate chain data 209 stored in the certificate chain data storage medium 208 and transmits certificate chain information to the certificate validation unit 204 to allow the certificate validation unit to determine the validity of the certificate to be validated in a rapid fashion.

Figure 3:
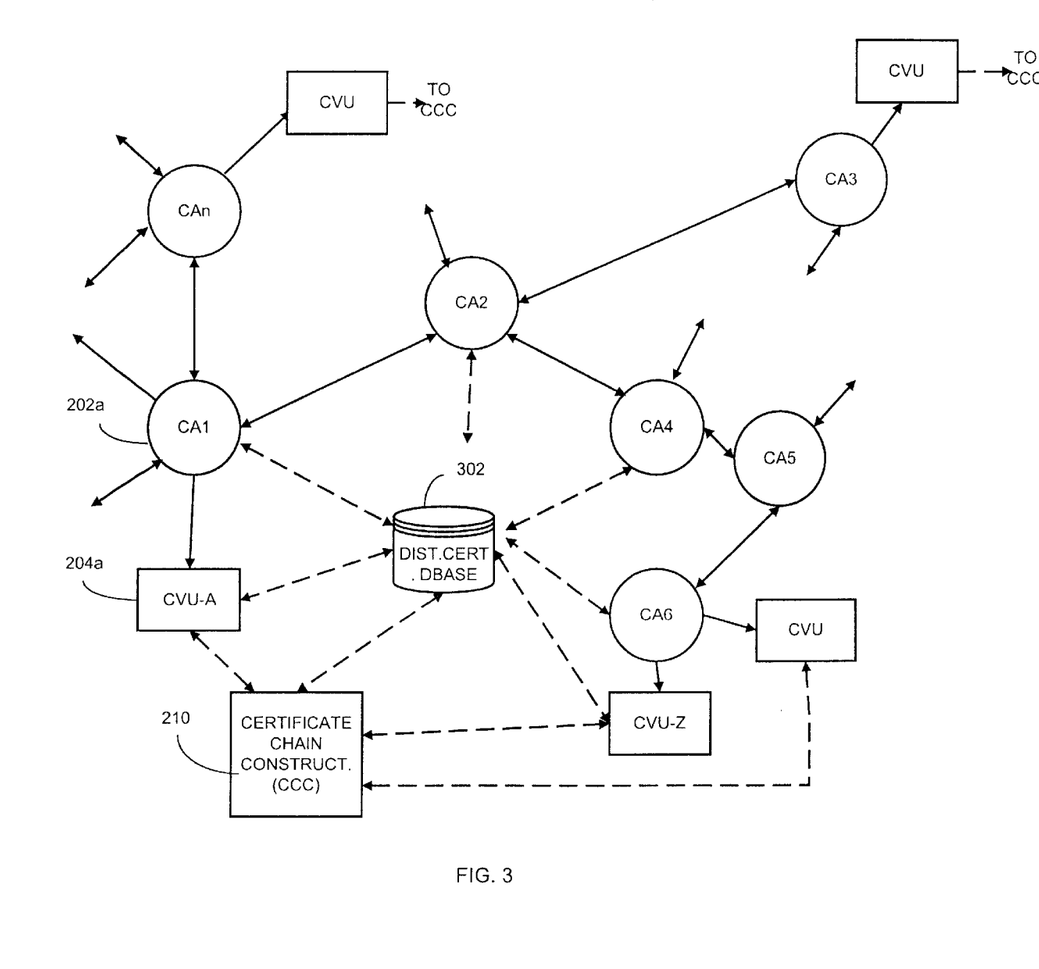
FIG. 3 is a graphic illustration of a communication system employing trusted paths utilizing one embodiment of the invention.

FIG. 3 shows a system diagram where multiple certificate issuing units 202 from differing networks or the same network have trust relationships with subscribers having certificate validating units 204. As with conventional public key cryptographic systems, each of the certificate issuing units 202 and certificate validating units 204 have access to one or more common directory databases 302 for the community of interest. This directory 302 may be of the type described in X.500 and may have authentication requirements such as those found in "The Directory Authentication Framework" ITU-T X.509 (i.e., ISO/IEC 9594-8 from the International Standards Organization). Any other suitable types of certificate repositories, for example those accessible via the Lightweight Directory Access Protocol (LDAP) as known in the art, or databases with a standard interface may also be used. As such, certificates of each of these certificate issuing units are stored therein as are certificate revocation data such as certificate revocation lists (CRL's) and authority revocation lists (ARL's) as known in the art (alternatively, all revoked certificates may be consolidated onto a single list, or recorded among many segmented lists). The certificates include certification authority trust data, such as data representing cross-certification data. Each subscriber (certificate validating unit) may read the directory 302 parts or all of which may be stored in cache memory of a subscriber or in a network server, and each of these certificate issuing units may read from or write to the directory 302. Also, the certificate issuing units 202 may revoke certificates of other certificate issuing units as known in the art as well as revoke certificates of subscribers' public keys. The solid lines indicate trust paths in a trust origination, dashed lines indicate a communication path. By way of example, subscriber with CVU-A has a trust link with certificate issuing unit one (CA1) and CA1 has a cross20 certificate trust path with CA2 and so on.

Figure 4:
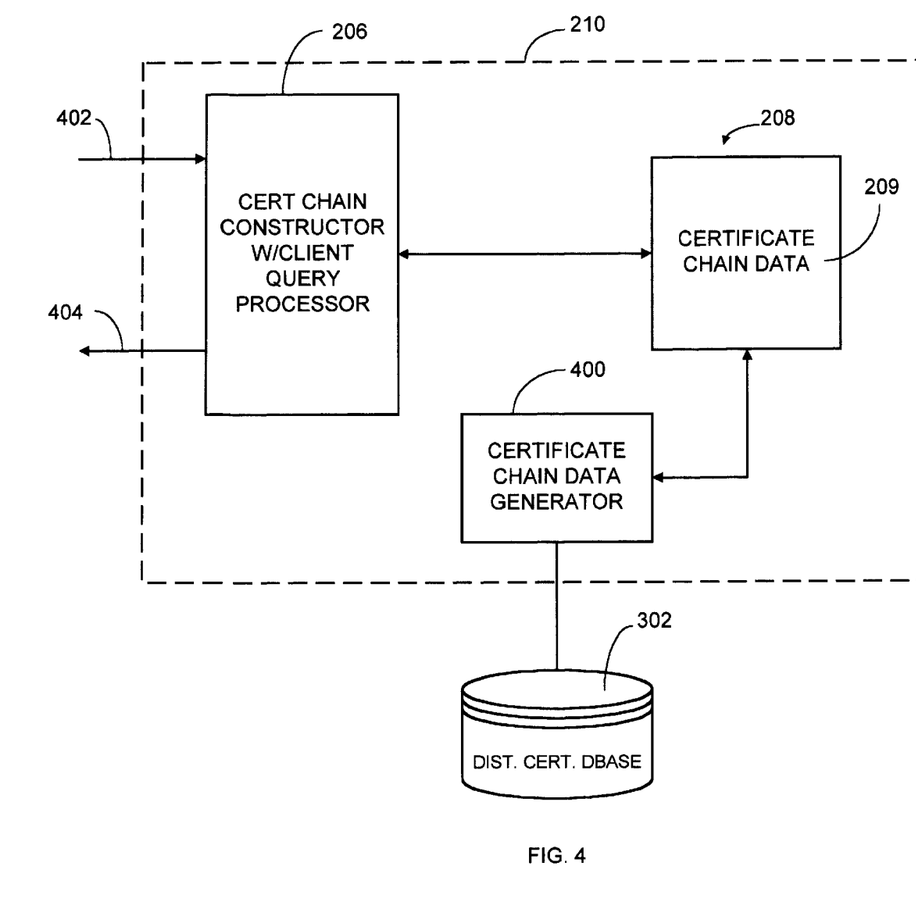
FIG. 4 is a block diagram of a certification chain generation and construction apparatus in accordance with one embodiment of the invention.

Referring to FIG. 4, the server 210 in addition to including a certificate chain constructing unit 206 and certificate chain data storage medium 208, may also include a certificate chain data generator 400 which may be a suitably programmed microprocessor or software module that is run on a common microprocessor of server 210. The certificate chain data generator 400 generates the certificate chain data 209 stored in the storage medium 208. Hence the certificate chain data generator 400 need not be part of the server 210 if such a device were to be a stand alone unit that periodically stored certificate chain data 209 into the certificate chain data device 208 a priori to a request from subscribers in the community of interest.

The certificate chain data generator 400 accesses the distributed directory 302 which is the conventional database containing certification authority trust data of all certificate issuing units in the community of interest as well as if desired, certificate revocation lists and authority revocation lists. Additional directories beyond the directory 302 may also be consulted. Using the certificate data in the directory 302, certificate chain data generator 400 compiles the certificate chain data and generates, in one embodiment, a table representing all (or a preferred subset) of the trust links among the certification authorities in the community of interest. The certificate chain data generator 400, in this embodiment, in effect determines all of the combinations of trust links within the community of interest once and writes this information to the certificate chain data storage device 208. Validation for multiple subscribers is based on the compiled certification authority trust data.

The storage device 208 stores compiled certificate chain data based on compiled certification authority trust data to facilitate validity determination of certificates by multiple subscribers. The certificate chain constructor 206 or other storage control device provides the stored compiled certificate chain data in response to a request by the multiple subscribers.

The certificate chain data generator 400 generates the certificate chain data 209 by analyzing the cross-certification data in the distributed directory 302 to derive linked trust relationships among various certificate issuing units to facilitate determination of, for example, a shortest trust path among selected certificate issuing units. For example, this determination may be made using common algorithms as are known in graph theory. For example, a subscriber, CA or other entity may need to utilize graph theory algorithms, such as Dijkstra's algorithm, to obtain a shortest trusted path among various CA's based on the certificate chain data. Some useful algorithms may be found for example in the aforementioned book of Aho, Hopcroft and Ullman, or in "Graph Theory with Applications", by J. A. Bondy and U. S. R. Murty, published in 1981 by Elsevier North Holland, New York, N.Y. (e.g., pages 14–19), incorporated herein by reference.

After analyzing the entries in the directory 302, the certificate chain data generator 400 in essence compiles the certification authority trust data to generate certificate chain data for repeated use by a plurality of subscribers in the community of interest. Once compiled, the certificate chain data generator 400 stores the certificate chain data 209 that is based on compiled certification authority trust data, to facilitate validity determination of certificates by multiple subscribers. Thus each validating unit need not perform the entire chain search and construction operation each time a document is sent or each time encryption is needed or each time a signature needs to be verified.

The software to control the certificate chain data generator 400 may be stored on a storage medium (not shown), such as a CD ROM, hard drive or other storage device for storing programming instructions that, when read by a processing unit, causes the processing unit to facilitate certificate chain data generation. The storage medium includes a first section of memory for storing programming instructions that facilitate compiling of certification authority trust data to generate certificate chain data for a plurality of subscribers wherein the certificate chain data represents trust relationships among a plurality of certificate issuing units in a community of interest, and includes a second section of memory to facilitate storing of the certificate chain data in storage medium 208, that is based on compiled certification authority trust data to facilitate validity determination of certificates by multiple subscribers.

The certificate chain database 208 may be periodically updated, for example by the certificate chain data generator 400 periodically polling the distributed directory 302 or other sources of certificate data to determine whether updates in the certificate trust data has occurred (additional certificates, revocation of certificates etc.) and recompiling the necessary database entries. For example, if a certification authority (CA) is added to the community of interest, the certificate chain data generator 400 obtains the new information from the directory 302 and adds any links based on the certification authority trust data associated with that new certificate issuing unit to incorporate the trust relationship as certificate chain data 209 in the certificate chain data database 208. Therefore where a database 302 includes certificates indicating cross-certification among certificate issuing units, the certificate chain data generator 400 uses the cross-certification information to note a trust path between the corresponding certificate issuing units.

Similarly, where certificate revocation data, such as CRL's and ARL's are included in the database 302, the certificate chain data generator 400 obtains the certificate revocation data and generates the certificate chain data consistent with the revocation data. For example, a CA may be excluded from a trust path because a cross-certificate for the CA has been revoked. Hence a trusted path link that has been severed because of a revoked certificate is reflected as a modification in trust links among the community of interest.

The certificate chain constructing unit 206 may also digitally sign the certificate chain data as a trusted entity to assert validity of the certificate chain data for subscribers relying on the certificate chain data so that subscribers or other entities that rely on the certificate chain data may validate that the certificate chain data is trusted. Each subscriber would then carry out conventional validation steps to confirm that the certificate chain data has not expired, has not been revoked or otherwise rendered untrustworthy. Alternatively, some or all of these steps could be carried out by unit 206, and the subscribing unit could rely upon the digital signature of unit 206 in the chain data as an assurance that these checks have been successful.

If desired, the certificate chain constructing unit 206 may also serve as a client query processor where subscribers are allowed to query for (request) a certificate chain prior to performing validation. In this embodiment, a given CVU generates a certificate chain query signal 402. The certificate chain constructing unit 206 receives the certificate chain query signal 402 from the given CVU over the communication link 212 (FIG. 2). The query may take many forms, but preferably indicates data representing an initial (start) and target (end) certificate issuing unit and/or it's public key, such as CA1 (FIG. 3) being the starting CA and CA6 being the target or end certificate issuing unit in the path. The indication of the start CA may be implicitly specified for example by the certificate of the requesting unit or the CA that issued certificate of the requesting unit or it may be fixed for a particular chain constructing unit. The query signal 402 may also include some selection criteria data.

The client query processor then reads the certificate chain data 209 and generates a preferred certificate path response signal 404 in response to the query for the requesting certificate validating unit. Where the query included selection criteria data, the response 404 includes data resulting from the filter in conformance to the additional selection criteria. In one embodiment, the preferred certificate path response signal 404 includes response data such as certificate issuing unit identification data, such as data identifying, for example, all certificate issuing units in the shortest trusted path between the designated start and target certificate issuing units as indicated in the query. Hence, the preferred certificate path response data may represent the complete preferred certificate chain involving certificate issuing units.

In another embodiment, the start and target CAs are known a priori by the subscriber from its own certificate and the target certificate to be validated, and the preferred chain data in the query response need only include identification data of remaining CAs in the shortest trusted path. (Alternatively, this information may also be included. The start CA identification data may also correspond to a self-signed certificate.) The requesting CVU then receives the certificate chain response signal 404.

The certificate validating unit 204 may then access the directory 302, or other suitable repository or data base or memory device, and obtain only those certificates for the associated certificate issuing units identified in the preferred certificate chain data 404 to determine whether the pending certificate is valid.

In another alternative embodiment, the certificate chain response signal 404 may include response data, such as the necessary certificates themselves, instead of or in addition to names of the CA in a complete shortest certificate chain. The certificates may be stored as the certificate chain data in the storage medium 208 so that the certificate validating unit need not perform the conventional access operation to the distributed directory 302. Hence, the certificate chain data generator 400 stores, for use by a certificate validation unit, the certificate chain data as certificate identification data entries, containing data representing CA-certificates and cross-certificates that form the preferred certificate chain to facilitate validation of the certificate to be validated.

Accordingly, one embodiment stores as certificate chain data the identification data entries of certificate issuing units in the community of interest, and optionally an ordered list of the certificate issuing units in the chain. As another embodiment the certificate chain data 209 may represent individual certificates from the distributed memory 302 or certificate chain data 209 may represent links in a trusted path from which a certificate chain may be determined.

Also, in a system that uses revocation data, if desired, the revocation data from ARL's and CRL's for example, may be obtained by the certificate validating unit instead of by the certificate chain data generator 400 so that the subscriber performs the revocation analysis as part of the certificate validating process. However, preferably, the certificate chain data generator 400 obtains certificate revocation data from the directory 302 and generates the certificate chain data 209 in response to determining whether a trusted path link exists based on the certificate revocation data from one of the plurality of certificate issuing units. If desired, the certificate chain data generator 400 may also store certificate revocation data that it obtained from the directory 302 and transmit the revocation data to the subscriber with the certificate chain data in the query response signal so that the subscriber need not again access the directory 302 or other revocation status checking means such as an on-line status checking server to determine revocation status.

Where the certificate chain constructing unit 206 is employed in the server, the server processing unit may be initially programmed by downloading programming instructions stored on a storage medium such as a ROM, CD ROM, diskette or other suitable storage medium that when loaded into the central processing unit of the server, the server performs the operations so described above. As such, the certificate chain data 209 and certificate chain constructing unit 206 can be incorporated in each subscriber, in a separate server, in each certification authority, or in any suitable combination of subscriber, CA, or other processing unit.

From a system perspective, in one embodiment, the certificate chain data generator 400 provides certificate chain data for repeated use by multiple subscribers to storage medium 208 based on cross-certification data among trusted certificate issuing units in a community of interest as obtained from the directory 302. A subscriber (CVU) queries the certificate chain constructing unit 206 to obtain certificate chain data 209 relating to a preferred certificate chain between certificate issuing units. The requesting subscriber receives the certificate chain data 209 via response signal 404 and uses the data to facilitate validity determination of the certificate to be validated.

Figure 5:
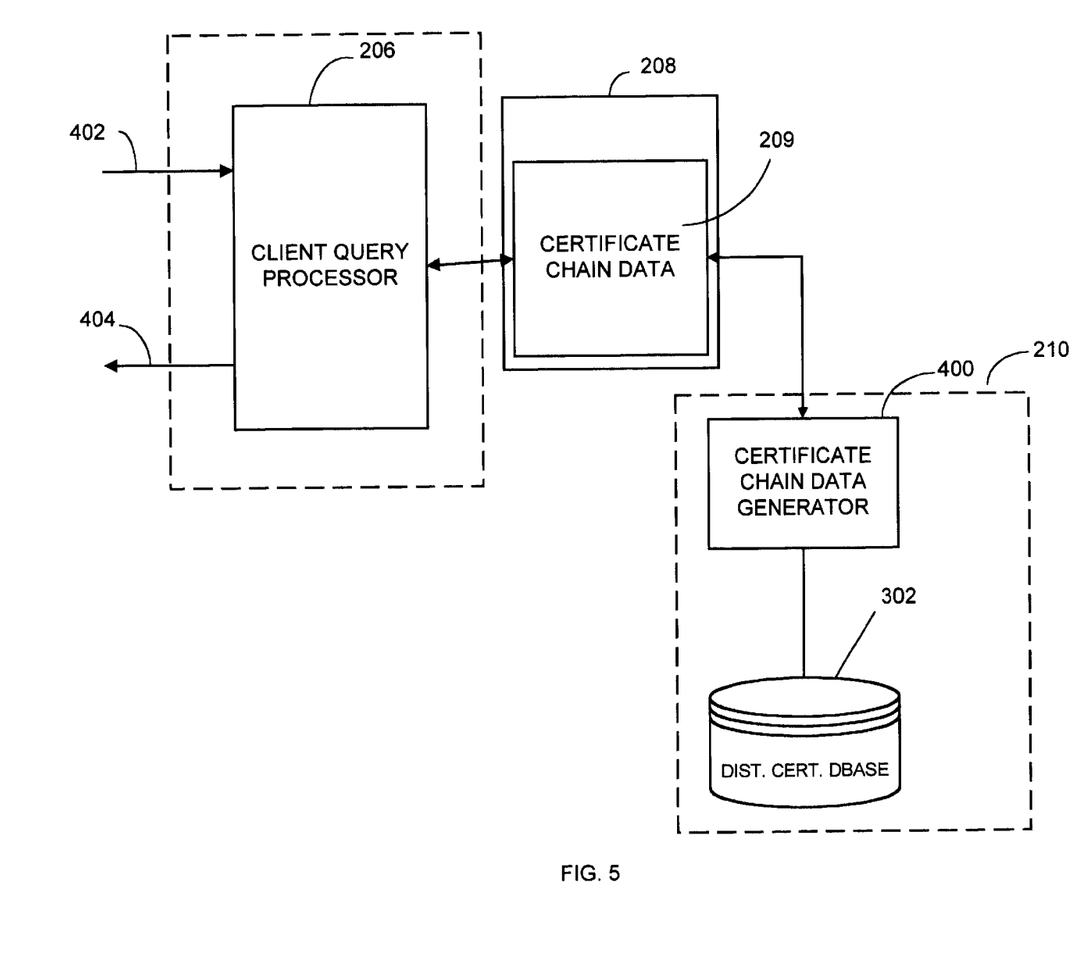
FIG. 5 is a block diagram generally illustrating an alternative embodiment of the invention.

FIG. 5 is a block diagram generally illustrating an alternative embodiment of the aforedescribed apparatus. In this embodiment, the subscriber 204a, as opposed to the server 210, includes the certificate chain constructing unit 206. The subscriber 204 accesses the certificate chain data storage medium 208 via a communication link instead of sending a request to the server 210.

Figure 6:
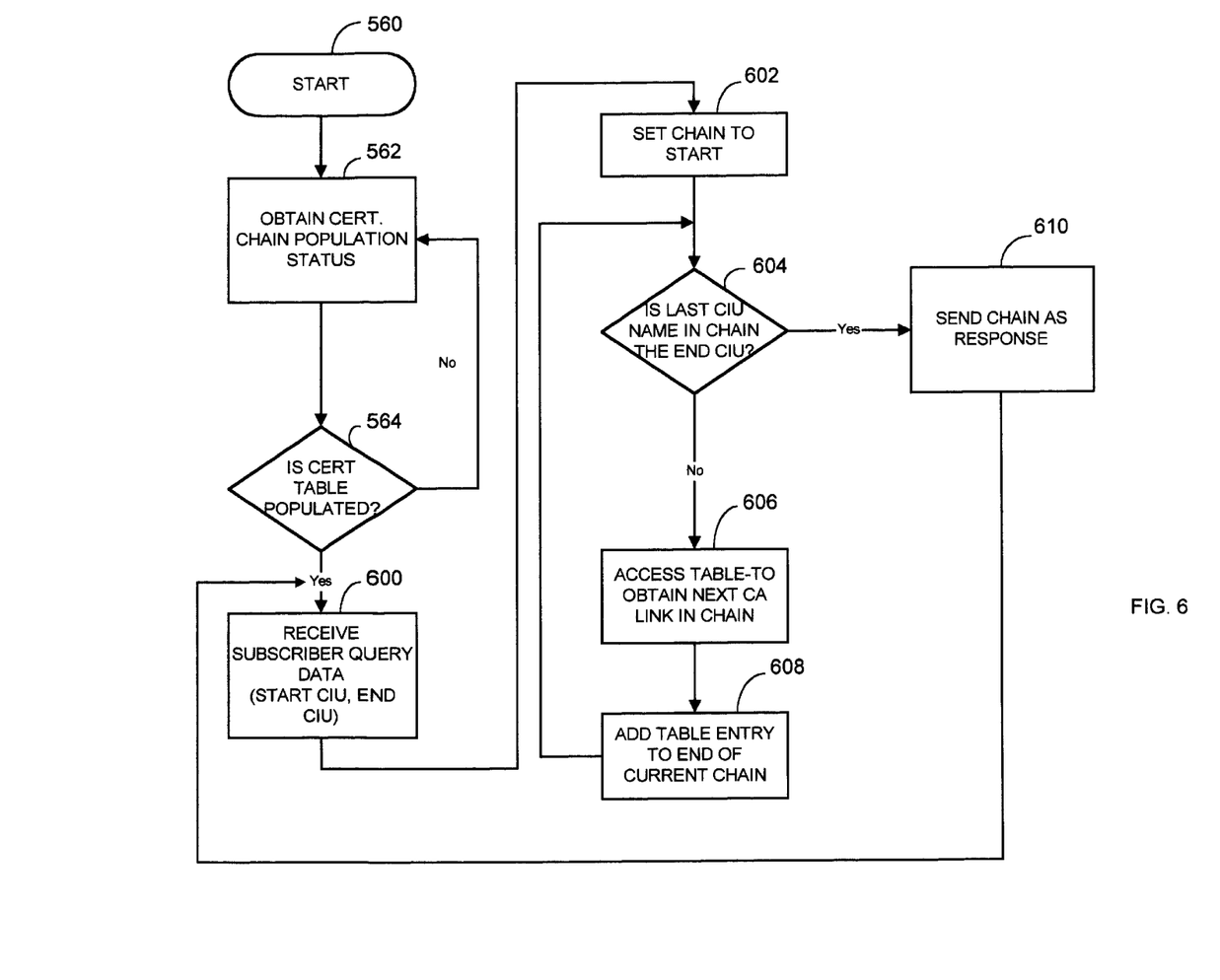
FIG. 6 is a flowchart generally illustrating one embodiment of a method of operation of a certificate chain constructing unit in accordance with one embodiment of the invention.
Figure 7A:
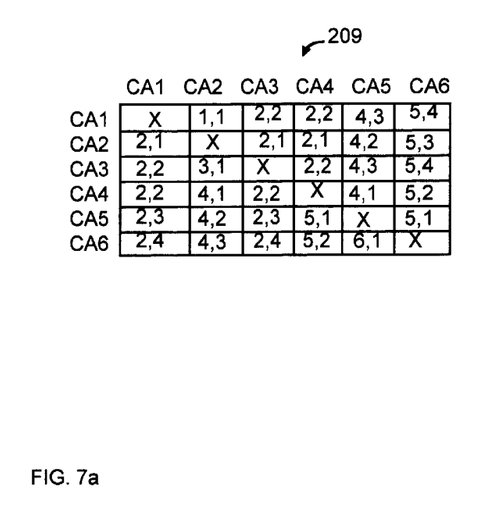
FIG. 7a is a diagrammatic illustration depicting trusted paths among a number of certificate issuing units in a community of interest along with one example of certificate chain data stored in the form of a table in accordance with one embodiment of the invention.

FIG. 6 is a flow diagram generally showing one example of a method of operation of the certificate chain constructing unit 206. The process starts in block 560 by allowing the certificate chain data generator 400 to populate the certificate chain data table 209 (see FIG. 7). Once the table is populated with all known or available trust relationships of the certificate issuing units in the community of interest, a population completion transmission is sent from the certificate chain data generator 400 to the certificate chain constructing unit 206. Hence as shown in block 562, the certificate chain constructing unit 206 obtains the certificate chain data population status from the certificate chain data generator 400. If table population is not complete, the certificate chain constructing unit waits until population is completed as shown in block 564. The certificate chain constructing unit 206 will then process the received query once the population has been completed.

The certificate chain constructing unit 206 as shown in block 600 receives subscriber (client) query data such as the name of a start certificate issuing unit and the name of an target certificate issuing unit. The certificate chain constructing unit 206 then sets the chain to begin at the start name received in the query as shown in block 602. The certificate chain constructing unit 206 then determines whether the end of the chain has been reached as shown in block 604. If the end of the chain has not been reached, the certificate chain constructing unit obtains the associated table entry for the next link from the certificate chain data table 209 as shown in block 606. This link in the chain is then added to the previous link as shown in block 608 and the process continues until the end of the shortest chain is reached. An entry in the certificate chain data 209 look up table includes the CA in the shortest path, data representing the list of CA's in a shortest path, other paths, more than one path or other data representing a trusted certificate chain between the start and target CA. As shown in block 610, data representing the preferred certificate chain is then generated and output in the form of response 404 to the requesting unit. If no certificate chain data is stored in a relevant entry of the look up table, the client query processor returns a signal indicating that no trust chain is known corresponding to the query.

FIG. 7a shows one example of intermediate level certificate chain data 209, in the form of a look up table, along with a diagrammatic example of a community of interest 700. The certificate chain data 209 is considered intermediate level data since additional constructing is performed by the certificate chain constructing unit. Each entry includes an ordered pair (X,Y) of two numbers: a CA identifier (1–6) and a trust link depth indicator. In the row indexed by R and the column indexed by C, the entry (X,Y) denotes that one may get from R to C by first going to X which is exactly one link from C; and the total number of links from R to C is Y. By way of example, referring to the first column, CA2 is shown as being one link from CA1; CA3 is shown as being two links from CA1 and that CA2 is the last CA on the path to CA3 from CA1; CA4 is shown as being 2 links from CA1 and that CA2 is the last CA on the path to CA4 from CA1. If a first subscriber which begins with the trusted public key of CA2 (start CA) received a message from a second subscriber that had its public key certified by CA6 (target CA), the first subscriber would send a request with identifying data that the initial CA was CA2 and the target CA was CA6. The certificate chain constructing unit then accesses the table and looks at row two, column six and obtains the entry [5,3] meaning that there are three links between CA2 and CA6 and that one of the links, namely the last, is from CA5 to CA6. Thus the remainder of the chain from CA2 to CA5 is determined similarly by consulting row 2, column 5 yielding entry [4,2], and continuing in this manner from the table, the chain constructing unit is able to determine that the chain from CA2–CA6 is CA2, CA4, CA5, CA6. Hence, this table data represents one embodiment of certificate chain data.

Figure 7B:
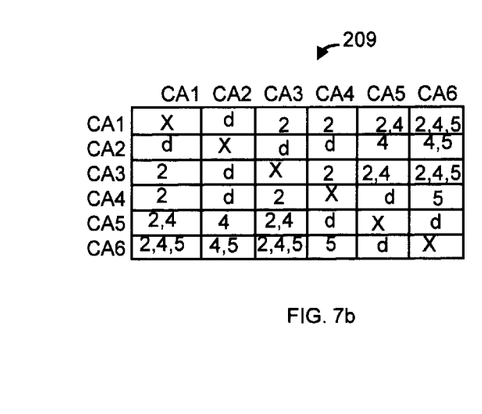
FIG. 7b is another example of certificate chain data stored in the form of a table in accordance with another embodiment of the invention.

FIG. 7b shows another example of generated certificate chain data 209. The certificate chain data 209 in this figure is considered high level certificate chain data since no additional construction is required to determine the shortest or preferred trusted certificate chain. Each table entry is a complete list of all CA names that make up a shortest path between a target CA and a start CA. For example, using the same example as in FIG. 7b where CA2 is the start CA and CA6 is the target CA, the table entry shows to go from CA2 to CA6, the subscriber would need to obtain certificate data associated with CA2, CA4 and CA5. In FIG. 7b, "d" indicates a direct link. For example, row 2, column 1 shows that CA1–CA2 involves only one certificate, that of CA2's public key signed by CA1. Whereas "none" would be the entry if no path existed.

Alternatively, if desired, corresponding certificate data itself for each certificate of each of the CA's may also be stored as part of the certificate chain data and sent to the subscriber to further reduce the processing requirement by the subscriber. Like the certificate chain data in FIG. 7a, this data is compiled from directory 302 entries by the certificate chain generator 400. Preferably, each table entry is signed by the certificate chain generator 400 (FIG. 4) providing an assurance that the certificate chain is trusted, because it has itself verified the chain, including taking into account revocation data information.

The certificate chain data generator 400 may be a software module in a separate server that searches directory entries of directory 302 or other information from which cross-certification relationships between CA's can be obtained. In addition, the certificate chain constructing unit and the certificate chain data generator may also be in each CA, system server, any number of subscribers or any combination of entities. A database may be compiled containing certificate chain data that may or may not need additional analysis to determine a preferred path, such as a shortest path, among CA's in a selected community of interest.

Where the certificate chain data is already in a form that indicates the names of each CA in a shortest trusted path, a querying unit need only obtain the certificate information corresponding to the listed CA's. Where the certificate chain data includes certificates (or certificate identification data) of the CA's in the shortest trusted path, the requesting unit need only validate based on the listed certificate information. If desired, the certificate chain constructing unit can also perform the validation process based on the compiled cross-certification data and send a secured "yes" or "no" response to a requesting unit so that requesting units, such as subscribers, need not perform the chain validation process. In such an embodiment, the query may include the target certificate along with a designated start CA (trust anchor). The chain constructing unit 206 then performs the validation process and returns response data representing a "yes" indicating that the target certificate can be trusted, or a "no" indicating that the target certificate cannot be trusted. If desired, a time stamp may also be applied as part of the certificate chain data or other response data.

In addition, if multiple trusted paths exist, the table data can store the chain data for all trusted paths and could provide all, any or one of the paths for use by a subscriber unit depending on request criteria from the subscriber or from some other source.

Also, if desired, each CA can determine its own certificate chain data such that the certificate constructing unit, if incorporated as part of a CA, may compile the certification authority trust data corresponding to all of its cross-certificates so that the CA provides certificate chain data for all CA's it is cross-certified with, or only a subset of the trust chains which that CA wishes to have used by its subscribers. In this way, a separate server is not needed and a subscriber need only query the CA that originally signed its public key certificate (implicitly trusted CA) to determine the shortest trusted certificate trust path. The trust data could be stored at the CA, a system server, a database which can be queried, or in a directory (302) or repository. For example, referring to FIG. 7b, each column of the certificate chain data corresponding to each CA may be stored in the directory 302 and signed by the CA storing the data. Each CA determines its own certificate chain data for each CA that it is cross-certified with and stores the certificate chain data in the directory 302. A subscriber may then look up its own CA's (initial point of trust) certificate chain data in the directory and obtain the certificates in the chain as listed.

Therefore, the certificate chain data may be, but is not limited to, a table of entries where each entry lists certification authority names for all CAs in a preferred trusted path with or without a digital signature from the certificate chain constructing unit, intermediate compiled data, such as a table entry showing the next CA in a shortest trusted path, the certificates themselves in the shortest trusted path, status indication, for example a yes/no response, to a subscriber query where validation of certificates in the trusted path is performed by an entity other than each subscriber, or any suitable combination of these methods.

Among other advantages, the above-described system and method generates certificate chain data once for use by more than one subscriber thereby eliminating the need for each subscriber to repeatedly perform certificate chain construction. Therefore system performance may be enhanced because of the reduction in processing and rapidity of certificate validation. Also, the certificate chain data may be digitally signed to further reduce verification efforts by subscribers and still ensure trust among subscribers in the community of interest.

It should be understood that the implementation of other variations and modifications of the invention in its various aspects will be apparent to those of ordinary skill in the art, and that the invention is not limited by the specific embodiments described. For example, a subscriber may have implicit trust in more than one CA. It is therefore contemplated to cover by the present invention, any and all modifications, variations, or equivalents that fall within the spirit and scope of the basic underlying principles disclosed and claimed herein.

What is claimed is:

1. A method for determining validity of a certificate in a communication system employing trusted paths among certificate issuing units and among subscribers comprising:

storing certificate chain data associated with a plurality of different subscribers, compiled from certification authority trust data, wherein the certification authority trust data represents trust relationships among various certificate issuing units in a community of interest; and constructing at least one preferred certificate chain based on the stored certificate chain data to facilitate validity determination of the certificate.

2. The method of claim 1 wherein the certification authority trust data includes cross-certification data and further includes the step of generating the certificate chain data by analyzing the cross-certification data to derive linked trust relationships among various certificate issuing units to facilitate determination of at least one preferred trust path among selected certificate issuing units.

3. The method of claim 2 wherein the step of generating includes obtaining certificate revocation data and generating the certificate chain data in response to determining whether a trusted path link exists based on the certificate revocation data from at least one of the plurality of certificate issuing units.

4. The method of claim 1 further including the step of digitally signing the certificate chain data to assert validity of the certificate chain data for subscribers relying on the certificate chain data.

5. The method of claim 1 wherein the step of constructing the preferred certificate chain includes generating preferred certificate path response data based on the certificate chain data to effect validity determination of the certificate.

6. The method of claim 1 including generating a certificate chain query including data representing at least a target certificate issuing unit and receiving the preferred certificate chain in response thereto.

7. The method of claim 1 wherein the certificate chain data includes certificate issuing unit identification data.

8. The method of claim 1 including the step of generating the certificate chain data by analyzing stored cross-certification data to derive linked trust relationships among various certificate issuing units to facilitate determination of a shortest trust path among selected certificate issuing units.

9. The method of claim 1 including storing, for use by a certificate validation unit, the certificate chain data as certificate identification data entries, containing data representing cross-certificates that form the preferred certificate chain to facilitate validation of the certificate to be validated.

10. The method of claim 1 including storing, for use by a certificate validation unit, the certificate chain data as data representing certificate issuing unit identification data of at least certificate issuing units between an initial certificate issuing unit and a target certificate issuing unit.

11. The method of claim 1 including receiving a certificate chain query and providing the preferred certificate chain in response thereto.

12. The method of claim 1 including the step of storing certificate revocation data corresponding to certificate issuing units represented in the preferred certificate chain to facilitate certificate validation.

13. A method for determining validity of a certificate in a communication system comprising:

querying, by a requesting unit, to obtain compiled certificate chain data based on cross-certification data among trusted certificate issuing units in a community of interest; and receiving, by the requesting unit, the compiled certificate chain data to facilitate validity determination of the certificate to be validated.

14. The method of claim 13 further including the step of digitally signing the certificate chain data to assert validity of the certificate chain data for subscribers relying on the certificate chain data.

15. The method of claim 13 wherein the step of querying includes generating a certificate chain query including data representing at least a target certificate issuing unit.

16. The method of claim 13 including the step of obtaining certificate revocation data and generating the certificate chain data in response to determining whether a trusted path link exists based on the certificate revocation data from at least one of the plurality of certificate issuing units.

17. The method of claim 16 including storing, for use by the requesting unit, the certificate chain data as certificate identification data entries, containing data representing individual certificates associated with certificate issuing units in the preferred certificate chain to facilitate validation of the certificate to be validated.

18. An apparatus for use in determining validity of a certificate in a communication system employing trusted paths comprising:

at least one storage medium having stored therein certificate chain data, compiled from at least certification authority trust data, representing trust relationships among a plurality of certificate issuing units in a community of interest; and at least one certificate chain data constructing unit, operatively coupled to the storage medium that constructs a preferred certificate chain associated with each of a plurality of different subscribers, based on the generated certificate chain data to facilitate validity determination of the certificate.

19. The apparatus of claim 18 including a certificate chain data generator means, operatively coupled to the storage medium, for generating the certificate chain data stored in the storage medium.

20. The apparatus of claim 19 wherein the certificate chain generator means determines the certificate chain data based on certificate issuing unit cross-certification data.

21. The apparatus of claim 19 wherein the certificate chain data generator obtains certificate revocation data and generates the certificate chain data in response to determining whether a trusted path link exists based on the certificate revocation data from at least one of the plurality of certificate issuing units.

22. The apparatus of claim 18 wherein the certificate chain constructing unit digitally signs the certificate chain data to assert validity of the certificate chain data for subscribers relying on the certificate chain data.

23. The apparatus of claim 18 wherein the certificate chain data constructing unit generates preferred certificate path response data based on the certificate chain data to effect validity determination of the certificate by a certificate validating unit.

24. The apparatus of claim 18 further comprising certificate validating means for generating a certificate chain query including data representing at least a target certificate issuing unit and for receiving the preferred certificate chain in response thereto.

25. The apparatus of claim 18 wherein the storage medium stores, for use by a certificate validating unit, the certificate chain data as certificate identification data entries, containing data representing individual certificates associated with certificate issuing units in the preferred certificate chain to facilitate validation of the certificate to be validated.

26. The apparatus of claim 18 wherein the storage medium stores, for use by a certificate validation unit, the certificate chain data as data representing certificate issuing unit links between an initial certificate issuing unit and a target certificate issuing unit.

27. The apparatus of claim 18 including means, operatively coupled to the certificate chain constructing unit, for receiving a certificate chain query and wherein the certificate chain constructing unit provides the preferred certificate chain in response thereto.

28. The apparatus of claim 18 wherein the storage medium contains certificate revocation data corresponding to certificate issuing units in the preferred certificate chain to facilitate certificate validation.

29. A method for determining validity of a certificate in a communication system employing trusted paths among certificate issuing units and among subscribers comprising:

storing compiled certificate chain data associated with different subscribers based on compiled certification authority trust data to facilitate validity determination of certificates by multiple subscribers; and providing the stored compiled certificate chain data in response to a request by at least one of the multiple subscribers.

30. The method of claim 29 wherein the stored compiled certificate chain data is data representing at least one certificate chain and the stored certificate chain data is compiled based on cross-certification data.

31. The method of claim 29 wherein the stored certificate chain data is data from which a preferred certificate chain may be constructed and the stored certificate chain data is compiled based on cross-certification data.

32. The method of claim 29 including the step of:

compiling certification authority trust data to generate the compiled certificate chain data for a plurality of subscribers wherein the compiled certificate chain data represents trust relationships among a plurality of certificate issuing units in a community of interest.

33. The method of claim 32 wherein the step of compiling includes obtaining certificate revocation data and generating the compiled certificate chain data in response to determining whether a trusted path link exists based on the certificate revocation data from at least one of the plurality of certificate issuing units.

34. The method of claim 29 including the step of receiving a certificate chain query and providing the stored compiled certificate chain data in response thereto.

35. The method of claim 29 including the step of receiving a certificate chain query and providing a response representing whether a target certificate is valid.

36. The method of claim 29 including the step of compiling, by a certificate issuing unit, the compiled certificate chain data corresponding to certificate issuing units having at least a cross-certification relationship with the certificate issuing unit and wherein the step of storing includes storing the compiled certificate chain data in a directory.

37. A storage medium for storing programming instructions that, when read by a processing unit, causes the processing unit to facilitate certificate chain data generation, the storage medium comprising:

first means for storing programming instructions that facilitate compiling of certification authority trust data to generate certificate chain data associated with a plurality of different subscribers wherein the certificate chain data represents trust relationships among a plurality of certificate issuing units in a community of interest; and second storage means for storing the certificate chain data that is based on compiled certification authority trust data to facilitate validity determination of certificates by multiple subscribers.

38. The storage medium of claim 37 wherein the first storage means further includes programming instructions that facilitate compiling by obtaining certificate revocation data and generating the certificate chain data in response to determining whether a trusted path link exists based on the certificate revocation data from at least one of the plurality of certificate issuing units.

* * * * *